Dec. 8, 1936. C. E. BERGER Re. 20,195
RHEOSTAT
Original Filed Sept. 5, 1933 3 Sheets-Sheet 1
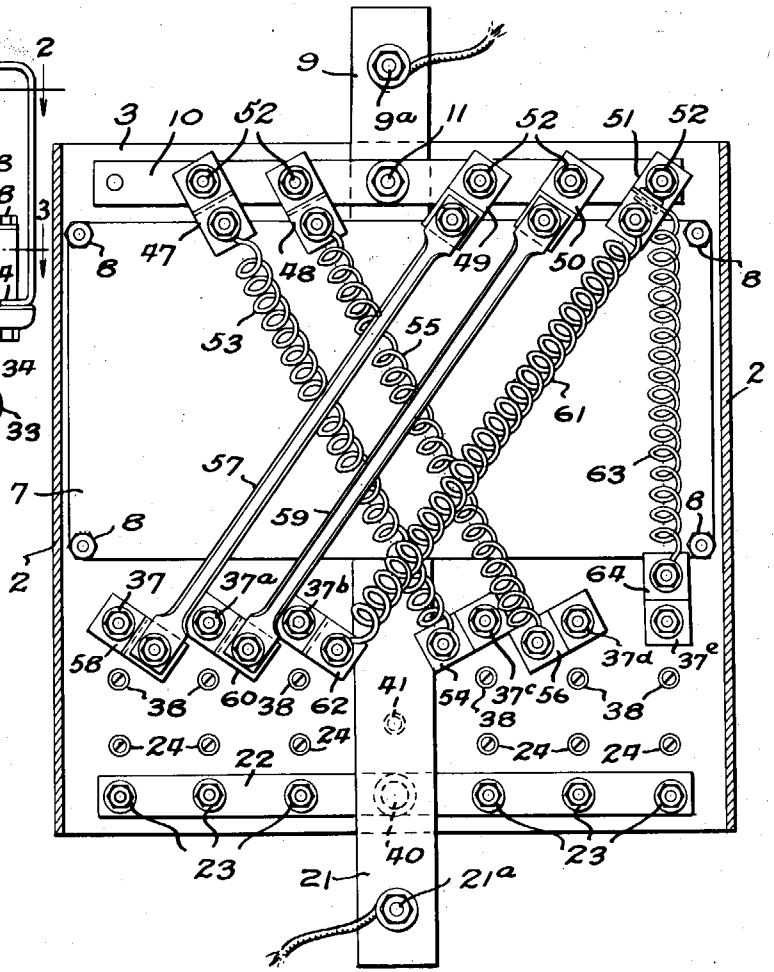
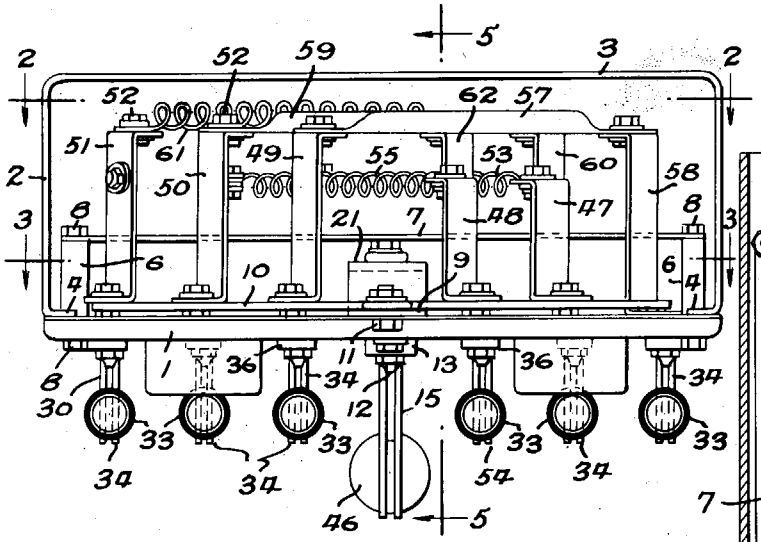
Fig. 1.
Fig. 2.
INVENTOR
CLARENCE E. BERGER,
BY
ATTORNEYS Dec. 8, 1936. C. E. BERGER Re. 20,195

RHEOSTAT

Original Filed Sept. 5, 1933 3 Sheets-Sheet 2

INVENTOR
CLARENCE E. BERGER,
BY
ATTORNEYS

Dec. 8, 1936. C. E. BERGER Re. 20,195

RHEOSTAT

Original Filed Sept. 5, 1933 3 Sheets-Sheet 3

INVENTOR
CLARENCE E. BERGER,
BY
ATTORNEYS

Reissued Dec. 8, 1936

Re. 20,195

UNITED STATES PATENT OFFICE 20,195

RHEOSTAT

Clarence E. Berger, Shrewsbury, N. J., assignor to Hanson-Van Winkle-Munning Company, Matawan, N. J.

Original No. 2,009,380, dated July 30, 1935, Serial No. 688,132, September 5, 1933. Application for reissue November 25, 1935, Serial No. 51,549

19 Claims. (Cl. 201—48)

This invention relates to improvements in rheostats, and has for its object to provide a rheostat in which the switches are reduced in length and are of heavier copper to prevent the bending of the blades or jaws when side pressure is applied.

It is an object of this invention to provide improvements for rheostats which are adapted for widely varying uses and which have particular utility for use in series with electroplating tanks connected to direct current circuits carrying a low voltage.

It is an object of this invention to provide, in connection with rheostats, resistors that are inclosed in a case which is open at its top and bottom, whereby a cooling draft is produced. The case is also used for mounting purposes.

It is also an object of this invention to provide, in connection with a case inclosing resistors, a baffle between the resistors and a panel supporting the case to prevent the heat of the resistors from radiating to the panel and heating the various instrumentalities that are supported on the panel.

It is an object to provide resistors adapted to carry heavier currents, the resistors being diagonally mounted to prevent the concentration of the heat at any one point of the panel.

It is a further object of the invention to provide resistor supports, consisting of thin strips of metal to prevent the heat of the resistor from being transmitted to the switches and to provide a broader surface for heat radiation. These supports also prevent the breaking of the resistor strips.

It is the object of the invention to provide a design for mounting strips for resistors of large capacity wide enough to offer maximum cooling area and thin enough to retard the transmission of heat but not thin enough to develop a material amount of heat by their own resistance.

By utilizing a proper proportion and by embodying this proportion in nickel with a thermal conductivity only 15% that of copper and a specific resistance 440% that of copper, thereby I secure an increased width of the nickel support over that of copper giving a stronger support and more radiating surface and, at the same time, the nickel has 15% of the thermal conductivity and 23% of the electrical conductivity of copper.

It is a further object to provide a master switch to open the circuit to the tank without the necessity of opening a number of small switches. This saves time and effort, particularly when the operator is wearing rubber gloves. It reduces wear and damage to the small switches and it enables the operator to disconnect the tank for loading and unloading and reconnect it without changing the rheostat setting, thereby insuring duplication of results.

It is a further object to be able to provide a short circuiting switch where necessary by providing another pair of jaws for the master switch connected to the other terminal of the rheostat. When such a short-circuiting switch is used the ammeter shunt so connected is also short circuited to prevent damage to the ammeter.

These and other advantages will appear from the following description taken in connection with the drawings.

Referring to the drawings:

Figure 1 is a top plan view of the panel with the case mounted thereon and the various rheostat elements supported on the front of the panel and on the rear of the panel within the case.

Figure 2 is a section on the line 2—2 of Figure 1.

Figure 5 is a section on the line 5—5 of Figure 1.

Figure 3:
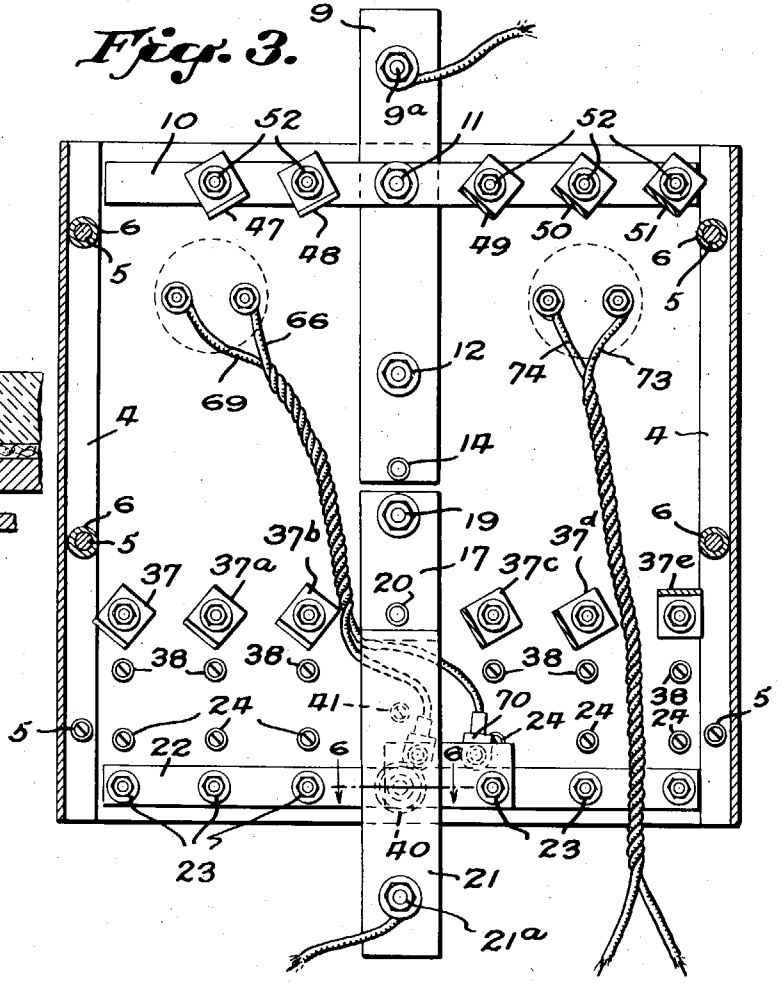
Figure 3 is a section on the line 3—3 of Figure 1.

The supporting and protective features of the present rheostat consist of a panel 1 and a case mounted upon the panel for inclosing the parts of the rheostat. This case is composed of two sides 2, and a back 3 attached to the panel by means of lateral flanges 4 on the sides, and bolts 5 passing through the flanges and the panel. Some of the bolts for holding the case on the panel are provided with spacers 6 for supporting on the bolts, in spaced relationship with the panel, a baffle plate 7 held on the spacers by means of nuts 8.

Connected to the panel at the top thereof, and between the panel and the back 3, is a conductor bar 9 adapted to be connected to the negative of a main line by means of binding post 9a. Fastened to this conductor bar, adjacent the upper edge of the panel, is a cross conductor bar 10 which serves as one of the terminals for the rheostat. These two bars are attached to the panel by means of a bolt 11. The terminal bar 10 is held in spaced relationship with regard to the panel 1 by means of the conductor bar 9 interposed therebetween.

The conductor bar 9 is also attached to the panel by means of a bolt 12 which passes through the panel and through a plate 13 on the outside of the panel for holding the plate to the panel. This plate and conductor bar are also connected to the panel by means of a screw 14 extending from the inside of the case, through the conductor bar, the panel and into the plate 13. On the plate 13 is a pair of contact jaws 15, each of which has a flared corner 16 for readily receiving the blade of a switch.

In line with the conductor bar 9 is a conductor bar 17 adapted to be connected to the work rod used for supporting the work in electroplating. Opposite the conductor bar 17, on the outside of the panel, is a plate 18. For the purpose of holding the conductor bar 17 and the plate 18 assembled on the panel a bolt 19 is provided. In addition to this bolt a screw 20 extends through the conductor bar, through the panel and into the plate. The conductor bar 17 is offset intermediate its ends to provide a part 21 held in spaced relationship with the panel having thereon a binding post 21*a* for connection with the work rod. Between the offset part of the conductor bar 17 and the panel is a cross conductor bar or rheostat terminal 22, held on the panel by means of bolts 23. There are seven of these bolts, of which the central one is designated 40 and others designated 23 extending through the cross conductor 22 and the panel from one end of the bar to the other.

Cooperating with these bolts 23 are screws 24 for attaching a plurality of plates to the panel on the outside of the case. These plates are designated 25, 26, 27, 28, 29 and 30. Each of these plates has extending upwardly therefrom a pair of posts 31, which pivotally support a contact blade 32 pivoted at one end to the posts. The contact blades are adapted to fit between contact jaws 34, each of which has a flared corner 35 for readily receiving the blade. These contact jaws are supported on plates 36 attached to the panel by means of bolts 37, 37*a*, 37*b*, 37*c*, 37*d* and 37*e*, in cooperation with screws 38, one screw for each bolt. Each blade 32 has a handle 33.

The bolt passing through the rheostat terminal 22 and the panel, beneath the offset part of the conductor bar 17, is designated by the numeral 40, which has cooperating therewith a screw 41 for holding a plate 39 upon the panel halfway between the ends of the rheostat terminal 22. Extending upwardly from the plate 39 is a pair of jaws 42, each of which has a flared corner 43 to receive the blade 44 of a master switch. This blade is supported at one end by means of two posts 45, extending outwardly from the plate 18, and this blade is adapted to engage the jaws 42 between the flared corners. The blade has an operating handle 46.

This blade is adapted to be thrown from engagement with the jaws 42 into engagement with the contact jaws 15. When the blade 44 engages the contact jaws 15 the resistance elements are all cut out. When the blade 44 engages the contact jaws 42 the various resistance elements may be cut in by operating the blades 32. Attached to the terminal 10 of the rheostat is a plurality of thin strips made of any suitable metal, preferably nickel. These strips prevent the heat of the resistors from being transmitted to the switches.

It has been found by experiment that by mounting the resistors on thin strips of a proper material and of proper size, the temperature rise at the switches is reduced one-third of that obtained when the resistors are mounted on heavy studs. These strips afford a wide cooling area, and are thin enough to retard the transmission of heat but not thin enough to develop much heat by their own resistance. At the top of the panel and extending across the inside of the panel on the terminal of the rheostat are five of these strips, 47, 48, 49, 50 and 51, attached to the terminal by means of bolts 52.

Connected to the strip 47 is a resistance coil 53, which is also connected to a strip 54 attached to the panel by means of the bolt 37*c*. Attached to the strip 48 is a resistance coil 55, which extends to and is attached to a strip 56 supported on the panel by means of the bolt 37*d*. Attached to the strip 49 is a channel resistance plate 57 which extends from the strip 49 to a strip 58, attached to the panel by means of the bolt 37. A channel resistance plate 59 is attached at one end to the strip 50, while its other end is attached to a strip 60, supported on the panel by means of the bolt 37*a*. A resistance coil 61 is attached at one end to the strip 51, while its other end is attached to a strip 62, supported on the panel by means of the bolt 37*b*. Attached at one end to the strip 51 is a resistance coil 63, which is attached at its other end to a strip 64 supported on the panel by means of the bolt 37*e*.

It will be observed from an examination of Figure 2 that the various resistance elements extend diagonally across the panel, with the exception of the resistance coil 63. By this means the heat from the resistance elements is fairly well distributed through all parts of the space inclosed within the case. It will be observed from an examination of Figures 2 and 5 that between these resistance elements and the panel is the baffle 7, which tends to protect the panel and the elements located thereon from the effect of the heat produced by the current passing through the resistance elements.

The various bars, plates, posts, switch blades and contact jaws are made of copper and serve as conductors for electricity. The strips are made of some suitable metal, such as nickel, while the resistance elements are made of some highly resistent metal.

Located on the outside of the panel is an ammeter 65, which has extending therefrom a conductor 69 for connecting the ammeter to an ammeter shunt plate 67 at the point 68. There also extends from the ammeter a conductor 66, which is attached also to the conductor 22 at the point 70. This plate 67 is supported in spaced relationship with the terminal 22 and is insulated at one end from the terminal by means of a washer 71, through which the bolt 40 passes.

Figure 6:
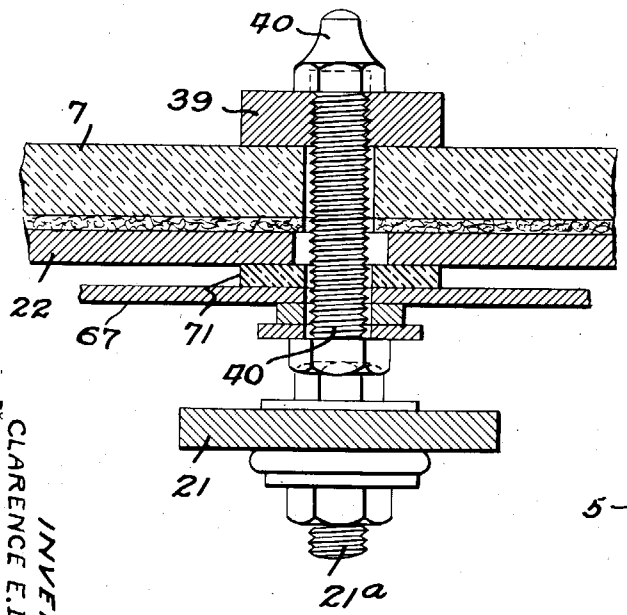
Figure 6 is an enlarged sectional view taken on the line 6—6 of Figure 3.
Figure 3:
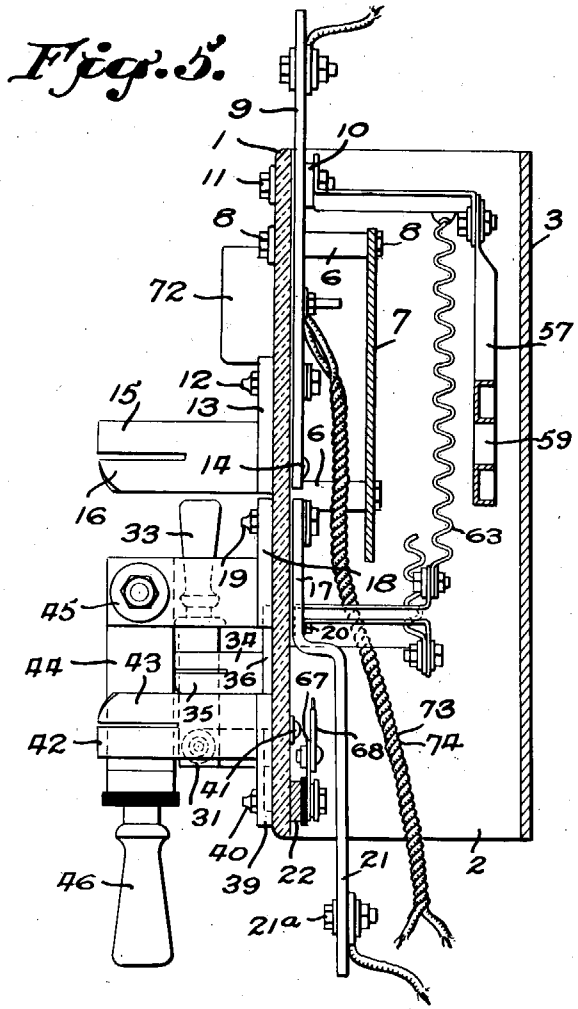
Figure 4:
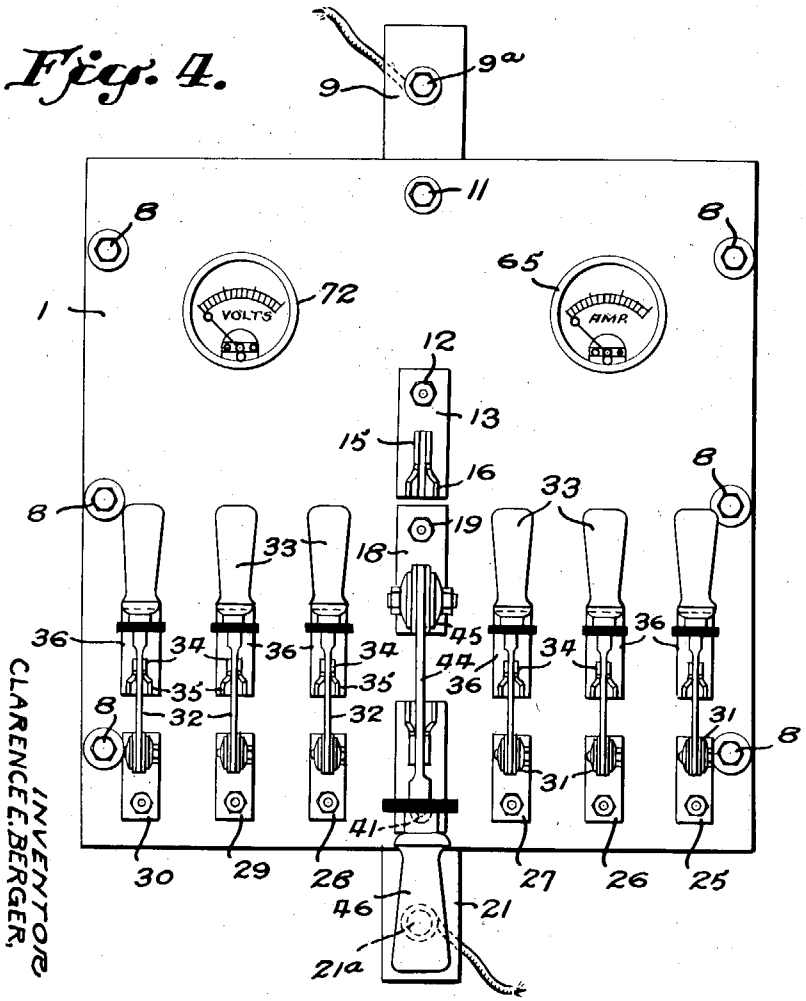
Figure 4 is a front elevation of the rheostat.

The plate 67 is connected in the manner shown in Figure 6 so that the only connection between the terminal 22 and the plate 39 is through plate 67 and the current resistors on the ammeter. When the master switch is closed upward to short circuit the rheostat there is no current through the shunt plate 67. The shunt plate may be mounted in a similar manner between the conductor bar 9 and the conductor bar 10. When no short circuiting switch is used the shunt plate 67 may be mounted at any point in the circuit, preferably on the member 9 or 21 to serve as a connection from either member to the bus bar. In this case the plate 39 and the terminal 22 are connected solidly by the bolt 40. There is also mounted on the panel a voltmeter 72, which has extending therefrom a conductor 73 adapted to be connected to the work rod, and a conductor 74 adapted to be connected to the anode rod.

When a current of electricity is passing through the resistance elements the heat therefrom is distributed through the space between the back 3 and the baffle 7 because of the diagonal arrangement of the resistance elements and because of the fact that these elements are not in alignment with each other, some being closer to the baffle than others. The heat created by the resistance elements causes a draft through the case. This draft through the case, between the baffle 7 and the back 3, creates also a draft of cold air between the panel and the baffle 7, thereby keeping the panel cool and all of the elements supported on the panel without the case cool.

While the conducting elements are generally copper or brass, other metal may be used, and other metals than nickel may be used as supports for the resistance elements.

It will be understood that I desire to comprehend within my invention such modifications as come within the scope of my claims and my invention.

Having thus fully described my invention, what I claim as new and desire to secure by Letters Patent, is:

1. In a rheostat, a panel having on one side a pair of aligned spaced conductor bars, a rheostat terminal bar connected to one conductor bar, a second rheostat terminal bar attached to the panel adjacent the other conductor bar, a plurality of resistance elements, each connected at one end to the first-named rheostat terminal bar and at its other end to the panel, means to electrically connect each of the other ends of the resistance elements to the second rheostat terminal bar, and means to electrically connect the conductor bars and to connect said other conductor bar to the second rheostat terminal bar.

2. In a rheostat, a panel having on one side a pair of aligned spaced conductor bars, a rheostat terminal bar connected to one conductor bar, a second rheostat terminal bar attached to the panel adajcent the other conductor bar, a plurality of resistance elements, each connected at one end to the first-named rheostat terminal bar and at its other end to the panel, switches to electrically connect each of the other ends of the resistance elements to the second rheostat terminal bar, and a switch adapted in one position to electrically connect the conductor bars and adapted in another position to connect said other conductor bar to the second rheostat terminal bar.

3. In a rheostat, a panel having on one side a pair of aligned spaced conductor bars, a rheostat terminal bar attached to one conductor bar, a second rheostat terminal bar attached to the panel and out of contact with the other conductor bar, a plurality of resistance elements, each connected at one end to the first-named rheostat terminal bar and at its other end to the panel, switches to electrically and selectively connect each of the other ends of the resistance elements to the second rheostat terminal bar, and a switch adapted in one position to electrically connect the conductor bars and adapted in another position to electrically connect said other conductor bar to the second rheostat terminal bar.

4. In a rheostat, a panel having on one side a pair of aligned spaced conductor bars, a rheostat terminal bar attached to one conductor bar, a second rheostat terminal bar attached to the panel and out of contact with the other conductor bar, a plurality of resistance elements, each connected at one end to the first-named rheostat terminal bar and at its other end to the panel, switches to electrically and selectively connect each of the other ends of the resistance elements to the second rheostat terminal, a switch adapted in one position to electrically connect the conductor bars and adapted in another position to electrically connect said other conductor bar to the second rheostat terminal bar, and means to protect the panel and the switches from the heat of the resistance elements.

5. In a rheostat, a panel having on one side a pair of aligned spaced conductor bars, a rheostat terminal bar attached to one conductor bar, a second rheostat terminal bar attached to the panel and out of contact with the other conductor bar, a plurality of resistance elements, each connected at one end to the first-named rheostat terminal bar and at its other end to the panel, switches to electrically and selectively connect each of the other ends of the resistance elements to the second rheostat terminal bar, a switch adapted in one position to electrically connect the conductor bars and adapted in another position to electrically connect said other conductor bar to the second rheostat terminal bar, and means to protect the panel and the switches from the heat of the resistance elements, said means comprising a baffle plate between the panel and the resistance elements.

6. In a rheostat, a panel having on one side a pair of aligned spaced conductor bars, a rheostat terminal bar attached to one conductor bar, a second rheostat terminal bar attached to the panel and out of contact with the other conductor bar, a plurality of resistance elements, each connected at one end to the first-named rheostat terminal bar and at its other end to the panel, switches to electrically and selectively connect each of the other ends of the resistance elements to the second rheostat terminal bar, a switch adapted in one position to electrically connect the conductor bars and adapted in another position to electrically connect said other conductor bar to the second rheostat terminal bar, and means to protect the panel and the switches from the heat of the resistance elements, said means comprising a casing around the resistance elements and a baffle plate within the casing between the resistance elements and the panel.

7. In a rheostat, a panel having thereon a pair of aligned spaced conductor bars, a rheostat terminal bar attached to one conductor bar, a second rheostat terminal bar attached to the panel out of contact with the other conductor bar, a plurality of nickel strips attached to the first-named terminal bar, a plurality of nickel strips attached to the panel, resistance elements connecting the first-named strips to the second-named strips, and means to electrically connect the conductor bars directly or through the resistance elements.

8. In a rheostat, a panel having thereon a pair of aligned spaced conductor bars, a rheostat terminal bar attached to one conductor bar, a second rheostat terminal bar attached to the panel out of contact with the other conductor bar, a plurality of nickel strips attached to the first-named terminal bar, a plurality of nickel strips attached to the panel, resistance elements connecting the first-named strips to the second-named strips, and means to electrically connect the conductor bars directly or through the resistance elements, said resistance elements being arranged in groups with the elements of one group extending across the elements of another group.

9. In a rheostat, a panel having thereon a pair of aligned spaced conductor bars, a rheostat terminal bar attached to one conductor bar, a second rheostat terminal bar attached to the panel out of contact with the other conductor bar, a plurality of nickel strips attached to the first-named terminal bar, a plurality of nickel strips attached to the panel, resistance elements connecting the first-named strips to the second-named strips, means to electrically connect the conductor bars directly or through the resistance elements, and means to protect the panel from the heat of the resistance elements.

10. In a rheostat, a panel having thereon a pair of aligned spaced conductor bars, a rheostat terminal bar attached to one conductor bar, a second rheostat terminal bar attached to the panel and out of contact with the other conductor bar, a plurality of nickel strips attached to the first-named terminal bar, a plurality of nickel strips attached to the panel, resistance elements connecting the first-named strips to the second-named strips, means to electrically connect the conductor bars directly or through the resistance elements, and means to protect the panel from the heat of the resistance elements, said means comprising a plate supported between the panel and the resistance elements.

11. In a rheostat, a panel having thereon a pair of aligned spaced conductor bars, a rheostat terminal bar attached to one conductor bar, a second rheostat terminal bar attached to the panel out of contact with the other conductor bar, a plurality of nickel strips attached to the first-named terminal bar, a plurality of nickel strips attached to the panel, resistance elements connecting the first-named strips to the second-named strips, means to electrically connect the conductor bars directly or through the resistance elements, and means to protect the panel from the heat of the resistance elements, said means comprising a casing around the resistance elements and a baffle plate between the resistance elements and the panel.

12. In a rheostat, a panel having thereon a pair of aligned spaced conductor bars, a rheostat terminal bar attached to one conductor bar, a second rheostat terminal bar attached to the panel out of contact with the other conductor bar, a plurality of nickel strips attached to the first-named terminal, a plurality of nickel strips attached to the panel, resistance elements extending diagonally of the panel and connecting the strips, and a switch adapted in one position to electrically connect the conductor bars directly and adapted in another position to connect the conductor bars through the second rheostat terminal bar and the resistance elements.

13. In a rheostat, a panel having thereon a pair of aligned spaced conductor bars, a rheostat terminal bar attached to one conductor bar, a second rheostat terminal bar attached to the panel out of contact with the other conductor bar, a plurality of nickel strips attached to the first-named terminal, a plurality of nickel strips attached to the panel, resistance elements extending diagonally of the panel and connecting the strips, a switch adapted in one position to electrically connect the conductor bars directly and adapted in another position to connect the conductor bars through the second rheostat terminal bar and the resistance elements, and means to protect the switch and the panel from the heat of the resistance coils.

14. In a rheostat, a panel having thereon a pair of aligned spaced conductor bars, a rheostat terminal bar attached to one conductor bar, a second rheostat terminal bar attached to the panel out of contact with the other conductor bar, a plurality of nickel strips attached to the first-named terminal, a plurality of nickel strips attached to the panel, resistance elements extending diagonally of the panel and connecting the strips, a switch adapted in one position to electrically connect the conductor bars directly and adapted in another position to connect the conductor bars through the second rheostat terminal bar and the resistance elements, and means to protect the switch and the panel from the heat of the resistance coils, said means comprising a plate supported between the panel and the resistance elements.

15. In a rheostat, a panel having thereon a pair of aligned spaced conductor bars, a rheostat terminal bar and attached to one conductor bar, a second rheostat terminal bar attached to the panel out of contact with the other conductor bar, a plurality of nickel strips attached to the first-named terminal bar, a plurality of terminal bars attached to the panel out of contact with the other conductor bar, a plurality of nickel strips attached to said plurality of terminal bars, a plurality of nickel strips attached to the panel, resistance elements extending diagonally of the panel and connecting the strips, a switch adapted in one position to electrically connect the conductor bars directly and adapted in another position to connect the conductor bars through the second rheostat terminal bar and the resistance elements, and means to protect the switch and the panel from the heat of the resistance coils, said means comprising a casing around the resistance elements and a baffle plate between the resistance elements and the panel.

16. In a rheostat including a panel having on one side thereof a pair of spaced conductor bars, a rheostat terminal bar attached to one of said conductor bars and a second rheostat terminal bar connected to the other of said conductor bars, and a plurality of resistance elements each having one end thereof connected to and spaced from one of said rheostat terminal bars and the other ends thereof connected to means spacing them from said panel, said means being connected to said second rheostat terminal bar; a baffle plate interposed between said panel and said spaced resistance elements in spaced relation therewith to form with the panel an open passageway for the free passage of a heat insulating column of cool air upwardly between the resistance elements and the panel to protect the panel and the elements mounted thereon from excessive heat generated by the resistance elements when in use.

17. In a rheostat, a panel having thereon a pair of spaced conductor bars, a pair of spaced rheostat terminal bars attached to the panel, one of said rheostat terminal bars being attached to one of said conductor bars, a plurality of strips having high electrical conductivity and low heat conductivity attached to one of said rheostat terminal bars, a plurality of strips having high electrical conductivity and low heat conductivity attached to the panel, substantially diagonally disposed resistance elements connecting the first-named strips to the second-named strips, and means to selectively connect said other conductor bar through said resistances to said first-mentioned conductor bar, the diagonal disposition of said resistances providing for substantially uniform distribution of heat throughout the width of the panel regardless of the number of resistance elements inserted in the circuit.

18. In a rheostat including a panel having thereon a pair of spaced conductor bars and a pair of spaced rheostat terminal bars, one of said rheostat terminal bars being attached to one of said conductor bars and having attached thereto a plurality of resilient resistance spacing strips having high electrical conductivity and low heat conductivity, a plurality of additional resistance spacing strips of like character mounted on the panel adjacent the other rheostat terminal bar and adapted to be selectively connected therewith, means for connecting said last-mentioned rheostat terminal bar with said other conductor bar and resistance elements connecting said resistance spacing strips to form a variable resistance; at least one of said resistance elements comprising a diagonally-arranged elongated metallic channel strip bridging a pair of said resilient resistance spacing strips whereby elongation of the resistance element when heated is compensated for by the resiliency of the resistance spacing strips supporting it.

19. In a rheostat, a panel having thereon a pair of spaced conductor bars and a pair of spaced rheostat terminal bars, one of said rheostat terminal bars being attached to one of said conductor bars, the second of said rheostat terminal bars being attached to said panel out of contact with the other conductor bar, a plurality of nickel strips attached to said first-mentioned rheostat terminal bar, a plurality of nickel strips attached to the panel adjacent said second rheostat terminal bar, diagonally extending resistance elements connecting said first-named strips with said second-named strips, and means to selectively connect each of said second-named strips to said second rheostat terminal bar and additional means to electrically connect said second rheostat terminal bar with said second conductor bar, the diagonal disposition of said resistances providing for substantially uniform disposition of heat throughout the width of the panel regardless of the number of resistance elements inserted in the circuit.

CLARENCE E. BERGER.